(12) United States Patent
Cappellotto

(10) Patent No.: US 11,602,950 B2
(45) Date of Patent: Mar. 14, 2023

(54) NIPPLE FOR SPOKED WHEELS OF THE TUBELESS TYPE

(71) Applicant: ALPINA RAGGI S.P.A., Lomagna (IT)

(72) Inventor: Guido Cappellotto, Arcore (IT)

(73) Assignee: ALPINA RAGGI S.P.A., Lomagna (IT)

(*) Notice: Subject to any disclaimer, the term of this patent is extended or adjusted under 35 U.S.C. 154(b) by 566 days.

(21) Appl. No.: 16/314,312

(22) PCT Filed: Jun. 21, 2017

(86) PCT No.: PCT/EP2017/065299
§ 371 (c)(1),
(2) Date: Dec. 28, 2018

(87) PCT Pub. No.: WO2018/001834
PCT Pub. Date: Jan. 4, 2018

(65) Prior Publication Data
US 2019/0283491 A1    Sep. 19, 2019

(30) Foreign Application Priority Data
Jun. 28, 2016   (IT) .................. 102016000067069

(51) Int. Cl.
*B60B 1/04* (2006.01)
*B60B 21/06* (2006.01)

(52) U.S. Cl.
CPC ............... *B60B 1/047* (2013.01); *B60B 1/04* (2013.01); *B60B 1/045* (2013.01); *B60B 21/06* (2013.01);
(Continued)

(58) Field of Classification Search
CPC ......... B60B 1/044; B60B 1/045; B60B 1/046; B60B 1/047; B60B 21/062; B60B 21/068; B60B 2900/511
See application file for complete search history.

(56) References Cited

U.S. PATENT DOCUMENTS 1,635,849 A * 7/1927 Isguerra .................. B60B 1/003
301/58
8,033,617 B2 * 10/2011 Cappellotto .......... B60B 21/068
301/58
(Continued)

FOREIGN PATENT DOCUMENTS

DE   102011120407 A1 *  6/2013 ............. B60B 1/003
EP      2403721 B1 *  7/2013 ............. B60B 1/047

OTHER PUBLICATIONS

PCT/EP2017/065299 International Search Report dated Oct. 5, 2017.

*Primary Examiner* — Jason R Bellinger
*Assistant Examiner* — Emily G. Castonguay
(74) *Attorney, Agent, or Firm* — Janeway Patent Law PLLC; John Janeway

(57) ABSTRACT

A nipple for spoked wheels of the tubeless type comprises a first and a second shoulder which are formed on a rod with a blind axial hole which is internally threaded at an end of the rod which is distal from the opening of the axial hole and in a zone of the rod which is proximal with respect to the opening, respectively. A first recess for a sealing ring is formed on the rod behind the first shoulder and at least a second recess for a second sealing ring is formed on the rod between the first recess and the second shoulder.

8 Claims, 1 Drawing Sheet

(52) U.S. Cl.
CPC ........ *B60B 21/068* (2013.01); *B60B 2360/50* (2013.01); *B60B 2900/211* (2013.01); *B60B 2900/511* (2013.01); *B60B 2900/5112* (2013.01); *B60B 2900/5114* (2013.01); *B60B 2900/5116* (2013.01); *B60Y 2200/12* (2013.01); *B60Y 2200/20* (2013.01)

(56) References Cited

U.S. PATENT DOCUMENTS

| | | | |
|---|---|---|---|
| 8,182,047 B2 * | 5/2012 | Cappellotto | B60B 21/064 |
| | | | 301/58 |
| 2008/0290721 A1 * | 11/2008 | Wang | B60B 1/047 |
| | | | 301/58 |

* cited by examiner

NIPPLE FOR SPOKED WHEELS OF THE TUBELESS TYPE

The invention relates to a nipple for spoked wheels of the type including the features set out in the preamble of the main claim.

A nipple provided with those features is known from current production of the same Applicant and from EP1926606.

This nipple produces an optimum coupling between the spokes and the rim in the spoked wheels which are mounted without an air chamber (tubeless), in particular in wheels for both on-road and off-road competition motorcycles. These wheels have a problem of continuous resilient deformations resulting from the high loads to which they are subjected. Similar deformations are transmitted with stress peaks in the rim-spoke/nipple assembly producing with a given frequency breakages of the spoke as a result of mechanical fatigue.

The solution set out by EP1926606 involves producing a mechanical connection which can slide between the rim and nipple so that the nipple can move in its seat of the rim with an alternating movement of the cylinder/piston type when the spoke is loaded in a point-like manner.

However, it has been found that this connection can cause disadvantages as a result of both the damage to the sealing O-ring and to the dragging of dust and dirt which in the end compromises the pneumatic fluid-tightness of the mounted wheel. Furthermore, when the means are washed after a competition or after normal use, perhaps using high-pressure washing lances, they can result in problems of ductility between the nipple and the relative highly undesirable fluid-tightness levels.

Other documents which represent the prior art are EP2094509 and EP2403721.

The problem addressed by the present invention is to provide a nipple for spoked wheels which is structurally and functionally configured to eliminate all the technical disadvantages set out with reference to the cited prior art.

This problem is solved by the invention by means of a nipple which is constructed according to the appended claims.

The characteristics and advantages of the invention will be better appreciated from the following detailed description of a preferred but non-limiting embodiment thereof which is illustrated by way of non-limiting example with reference to the appended drawings, in which.

Figure 1:
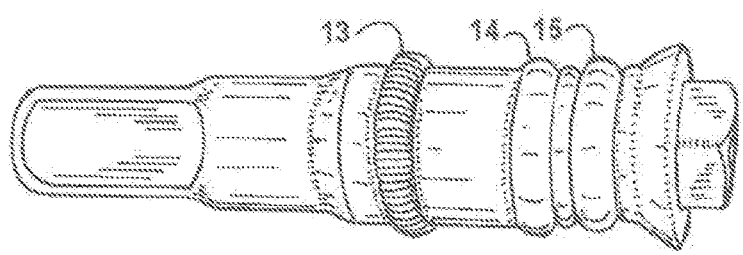
FIG. 1 is a perspective view of a nipple which is produced according to the present invention.
Figure 2:
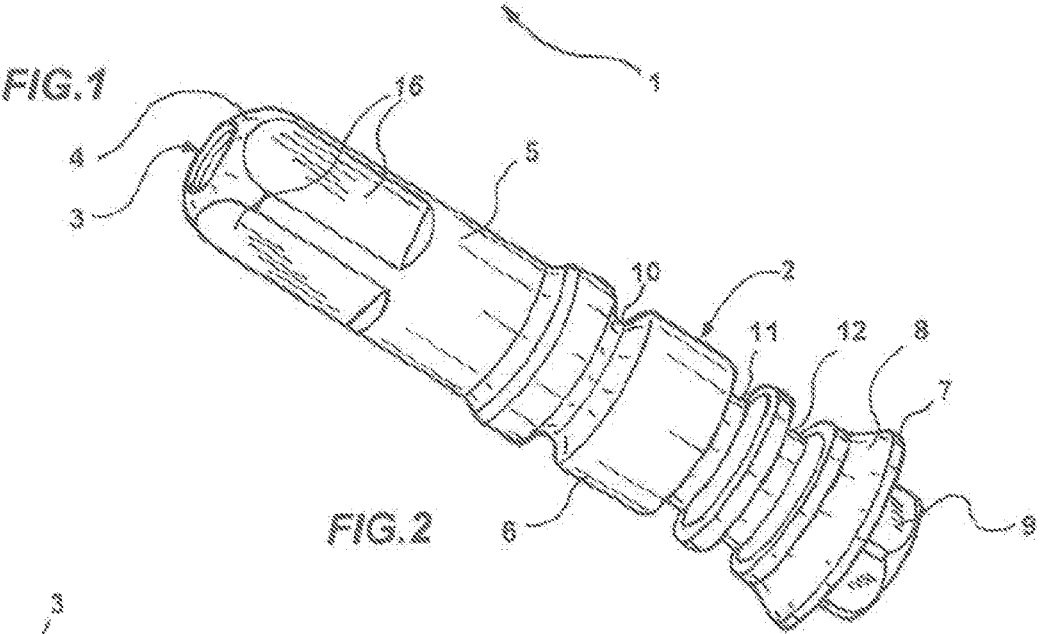
FIG. 2 is a perspective view of the rod of the nipple of FIG. 1.
Figure 3:
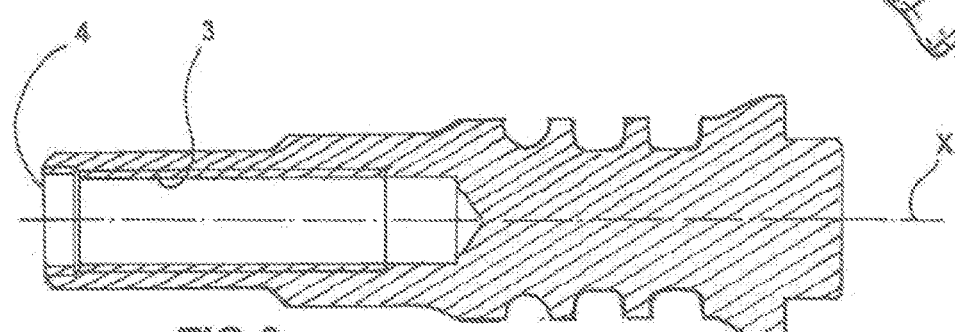
FIG. 3 is an axial section of the rod of FIG. 2.
Figure 4:
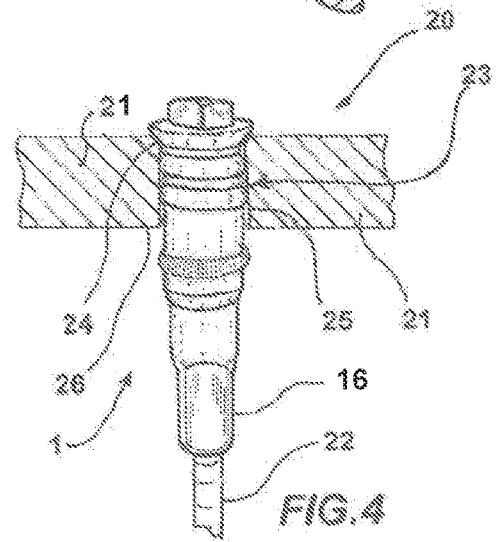
FIG. 4 is a partial cross-section of a spoked wheel with the nipple of this invention.

In the Figures, there is generally designated 1 a nipple which is produced according to the present invention.

The nipple 1 comprises a rod 2 which is substantially cylindrical, which has an axis X with an axial blind hole 3 which is internally threaded.

The hole 3 has an opening 4 which is open at an axial end of the rod 2 and which extends in the rod over an extent which is less than the total length thereof.

A first manoeuvring key 16 is formed on the rod 2 from the opening 4; this manoeuvring key has a polygonal, preferably square, cross-section.

A first cylindrical portion 5 extends between the manoeuvring key 16 and a second cylindrical portion 6 of the rod 2, the second cylindrical portion 6 having a greater diameter with respect to the diameter of the first portion 5.

The cylindrical portion 6 terminates in a head 7 of the nipple which has a first shoulder 8 which is rounded in the manner of a spherical ball sector which faces the cylindrical portion 6 and a second manoeuvring key 9 having a polygonal outline, which is used to grip and rotate the nipple from the outer side of the wheel rim.

Along the cylindrical portion 6 there are formed three recesses 10, 11, 12, the first two (11, 12) one behind the other and the shoulder 8, while the third (10) is formed in a substantially central position along the axis of the rod, in a distal relationship with respect to the first shoulder 8.

The first two recesses are provided with a U-shaped groove in order to receive respective sealing rings 14, 15 having O-rings. The third recess 10 is provided with a semi-rounded groove in order to receive a resilient ring 13 of the type with a helical spring which acts as a second shoulder of the nipple 1.

In order to construct a wheel 20 using a rim 21 and spokes 22, the nipples 1 are positioned in respective seats 23 of the rim 21 so as to converge towards the wheel centre with the first manoeuvring key 16.

Each seat 23 has a cup-like end 24 with a circular sphere sector, which conforms to the shoulder 8, and a cylindrical portion 25 which terminates in a surface 26. The nipple is inserted in the seat 23 until the shoulder 8 is received in the cup-like end 24. Under those conditions, the third recess 10 projects beyond the surface 26 so as to allow axial play of the nipple 1 in the respective seat 23. This axial play is limited by the shoulder 8 with the cup-like end 24 and, at the opposite side, by the shoulder formed by the resilient ring 13 with the surface 26.

The axial movement of the nipple 1 in the seat 23 is such that those shoulders limit the extent thereof in such a manner that in any case both the sealing rings 14, 15 remain bonded with the cylindrical internal surface 25 of the seat 23.

The invention thereby solves the problem set out and achieves a number of advantages, including the combination of a suitable structure for providing optimum resistance to fatigue combined with pneumatic strength which is improved in any circumstances.

The invention claimed is:

1. A nipple for spoked wheels of the tubeless type, the nipple comprising:
    a rod having an axis, and including:
        an axial blind hole which is internally threaded and which extends in an axial direction along the axis, the axial blind hole having an opening located at an axial end of the rod,
        a first cylindrical portion proximate the axial blind hole and having a diameter, and
        a second cylindrical portion distal the axial blind hole and having a diameter that is greater than the first cylindrical portion's diameter;
    a first manoeuvring key having a polygonal profile formed on the rod and extending in the axial direction proximate to the opening;
    a second manoeuvring key having a polygonal profile formed on an end of the rod opposite the opening in the axial direction;
    a first and a second shoulder, the first shoulder being formed on the rod at an end of the rod which is distal in the axial direction from the opening of the axial hole, and the second shoulder located between the opening and the first shoulder;

a first recess for a sealing ring formed in the second cylindrical portion of the rod, the first recess being formed between the first shoulder and the second shoulder in a position along the axial direction proximate to the first shoulder;

a second recess for a second sealing ring formed in the second cylindrical portion of the rod;

wherein the first cylindrical portion extends between the first manoeuvring key and the second cylindrical portion;

wherein the first manoeuvring key's profile surrounds a portion of the rod's axis and is located a distance away from the axis that is less than half of the first cylindrical portion's diameter; and wherein the second shoulder is formed by a resilient ring defined by a helical spring housed in a third recess formed on the second cylindrical portion of the rod, the helical spring being dimensioned so as to limit axial play of the nipple in a respective seat of a rim in which the nipple is housed, while the sealing rings remain bonded with a cylindrical internal surface of the seat so as to seal the seat.

2. The nipple for spoked wheels according to claim 1, wherein the second recess is formed between the first recess and the second shoulder.

3. The nipple for spoked wheels according to claim 1, wherein the sealing rings have an O-ring.

4. The nipple for spoked wheels according to claim 1, wherein the third recess is in a substantially central position along the axis of the rod.

5. The nipple for spoked wheels according to claim 2, wherein the second recess is formed in a position along the axial direction proximate to said second shoulder.

6. The nipple for spoked wheels according to claim 5, wherein a distance defined along the axial direction between the first recess and the second recess is smaller than a distance formed defined along the axial direction between the first recess and the third recess.

7. The nipple for spoked wheels according to claim 1, wherein the first recess and the second recess has a respective polygonal section and the third recess has a round section.

8. The nipple for spoked wheels according to claim 1, wherein the first cylindrical portion and the second cylindrical portion are connected by a tapered portion of the rod.

* * * * *